Feb. 22, 1966 J. D. BLETTNER 3,236,034
LAWN MOWER AND DRIVE MECHANISM THEREFOR
Filed Nov. 18, 1963 2 Sheets-Sheet 1

INVENTOR.
James D. Blettner
BY
Lockwood, Woodard, Smith & Weikart
Attorneys

Feb. 22, 1966    J. D. BLETTNER    3,236,034
LAWN MOWER AND DRIVE MECHANISM THEREFOR
Filed Nov. 18, 1963    2 Sheets-Sheet 2

INVENTOR.
James D. Blettner
BY
*Lockwood, Woodard, Smith & Weikart*
Attorneys

United States Patent Office 3,236,034
Patented Feb. 22, 1966

3,236,034
LAWN MOWER AND DRIVE MECHANISM THEREFOR
James D. Blettner, Box 454, Buck Creek, Ind.
Filed Nov. 18, 1963, Ser. No. 324,418
1 Claim. (Cl. 56—6)

This invention relates generally to lawn mowers and more particularly to lawn mowers of the type comprising a plurality of moving units which may be attached to and driven from a tractor.

Conventional lawn mowing equipment of the tractor driven type usually comprises a single mower unit attachable beneath the tractor or to the front end thereof. Where there is only a single mower unit it is a relatively simple matter to mount it to the tractor and make the drive connection. However, more powerful tractors have been developed which are capable of propelling and driving multiple mower units. The adaptation of multiple mower units to a single tractor has created the necessity of so connecting the multiple mowers to the tractor that they will follow the contour of the ground, cutting the grass at a uniform length and at the same time avoiding gouging or scouring the lawn where there are uneven contours. To overcome this difficulty, a plurality of relatively short mowers are attached to the tractor so that each individual mower may ride over the grass at a predetermined level. This introduces the necessity of providing a drive mechanism for each individual mower unit, such that the mowers are always driven properly even though they move upwardly and downwardly with respect to the tractor.

The principal object of this invention is to provide a novel means of connecting a plurality of mower units to the tractor in such a manner that each mower unit follows the contour of the ground and is free to move upwardly and downwardly with respect to the tractor as well as through vertical angles with respect to the horizontal plane of the tractor axle.

A further object of this invention is to provide a drive linkage for the multiple mower units attached to a tractor for more or less universal angular movement with respect to the tractor.

In accordance with this invention there is provided means for attaching a plurality of mower units to a tractor comprising a shaft mounted to the tractor frame transversely thereof, a pair of connectors rotatably mounted on said shaft, each connector including a forwardly projecting tubular member, and means connected to each mower unit comprising a shaft rotatably mounted within said tubular members whereby each mower unit is pivoted about said tractor mounted shaft for radial movement with respect thereto and is pivoted with respect to its associated tubular member for angular movement about an axis at right angles to said tractor mounted shaft.

A further feature of this invention comprises a drive shaft coaxially mounted with the connectors and having power operated pulleys at each end thereof for driving cutter operating pulleys disposed on said mower units substantially in alignment with said power operated pulleys.

The full nature of the invention will be understood from the accompanying drawings and the following description and claim:

Figure 1:
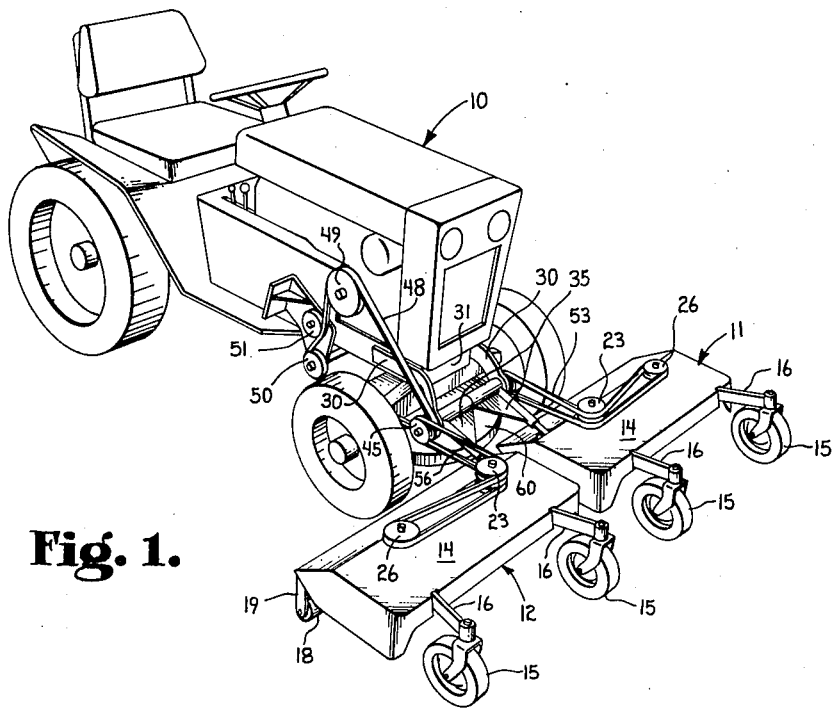
FIG. 1 is a perspective view illustrating the mower apparatus as provided in accordance with this invention.
Figure 2:
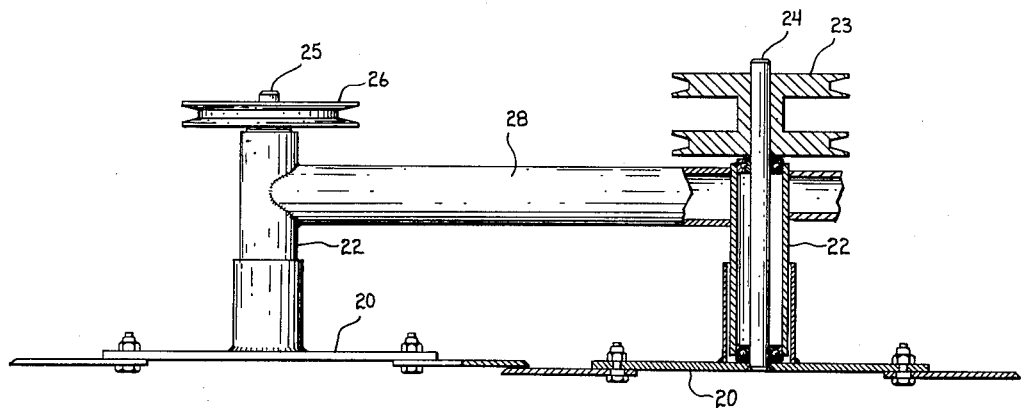
FIG. 2 is a detail, partially in cross section, illustrating the cutters and their supporting and driving mechanism.

FIG. 1 of the drawing illustrates this invention as it is mounted to a conventional tractor 10. The mowing apparatus, as provided in accordance with this invention comprises two mower units 11 and 12, each comprising a shroud 14 to which are mounted caster wheels 15 by means of forwardly projecting support members 16 welded or otherwise fixed to the shrouds. The rear portions of each mower unit ride on rollers 18 rotatably mounted on bracket members 19 which, in turn, are fixed to the shrouds 14.

Mower units 11 and 12 further comprise conventional cutters 20, each of which is rotatably supported on shaft and bearing assemblies 22. In each mower unit there is provided a double drive pulley 23 mounted on a shaft 24 to which a cutter 20 is attached. The other cutter 20 of each mower unit is driven by a shaft 25 on which is mounted a drive pulley 26. Each of the bearing assemblies 22 may be welded or otherwise attached to and mounted on a longitudinal beam 28 welded or otherwise attached to the shroud 14.

The mower units 11 and 12 are connected to tractor 10 by an assembly which includes a pair of bracket members 30, each of which is welded or otherwise attached to the forward end of the frame 31 of the tractor 10. The outer ends of brackets 30 support a tubular bearing 33, each end of which may be threaded into the outer end of the brackets as indicated at 34. The L-shaped connectors 35 include a bearing portion 36 rotatably mounted on the bearing 33 and a forwardly projecting female coupler 37. A bracing web 38 is attached to members 36 and 37 for providing stiffening support for each of these members. The beams 28 include right angle extensions 40 which project through apertures 41 in the shrouds and into the female couplers 37 in rotatable and slidable relation thereto. Extensions 40 form male coupling members which are telescoped within the female couplers 37 so that each mower unit is pivotally coupled to the tractor for rotational movement through a vertical angle with respect to the longitudinal axis of the tractor. The connectors 35 are rotatable about an axis which is transverse of the tractor whereby the mower units pivot through a vertical angle relative to the axis of the bearing 33. Thus, the mower units are free to follow the contour of the ground over which they travel.

Figure 3:
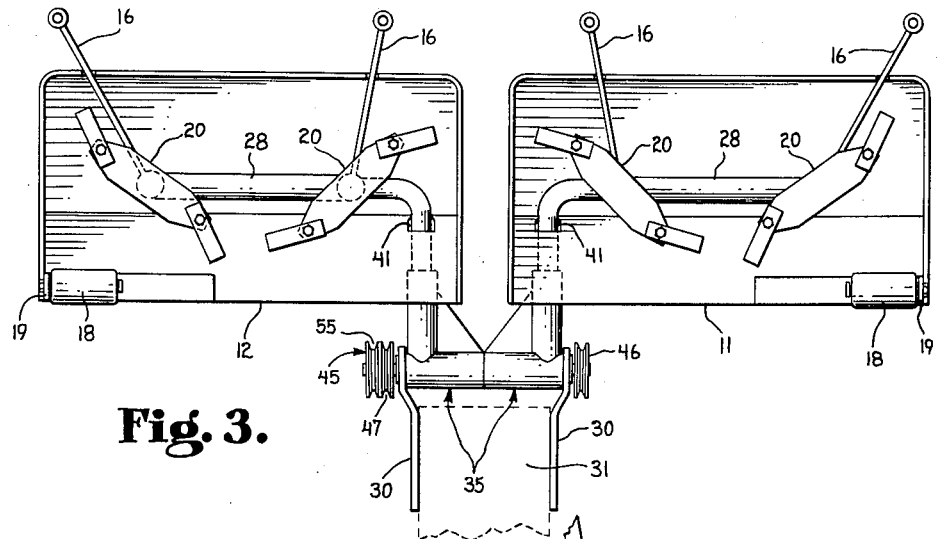
FIG. 3 is a bottom plan view of the mower units and their supporting mechanism.
Figure 4:
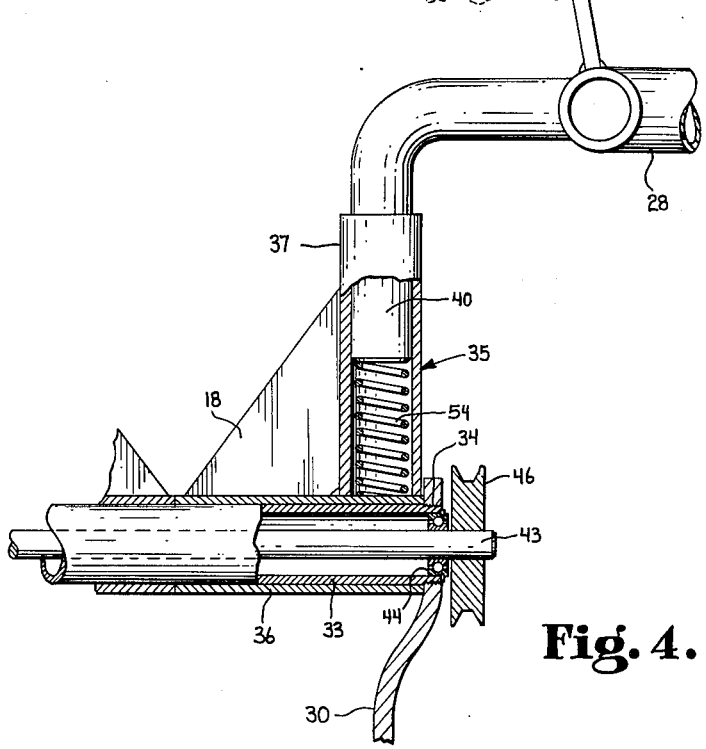
FIG. 4 is a detail, partially in cross section, of the mower connecting mechanism as provided in accordance with this invention.

In order to maintain the driving connection from the tractor to the mower units there is provided a shaft 43 which is supported coaxially with bearing member 33 by means of the antifriction bearings 44. Shaft 43 carries at one end thereof a double pulley 45 and at the other end thereof a single pulley 46 (FIG. 3). The pulley section 47 of pulley 45 is connected to the tractor engine by means of a belt 48 which engages an engine driven pulley 49, idler pulley 50 and a belt tightening or clutching pulley 51 whereby shaft 43 and pulleys 45 and 46 may be driven from the tractor engine. The pulley 46 is coupled to pulleys 23 and 26 of mower unit 11 by means of a belt 53. It should be noted that pulley 46 is in substantial alignment with the outer periphery of pulley 23 where the belt 53 enters the grooves of pulley 23. It should further be noted that pulley 23 is at substantially the same radial distance from pulley 46 as is the beam 28. Therefore, no matter how mower unit 11 oscillates about the front end of the tractor, belt 53 will always be in engagement with pulleys 23, 26 and 46. This belt engagement is further enhanced by the provision of the coil spring 54 (FIG. 4) which is disposed within the coupler 37 and is compressed between the end of member 40 and the outer surface of member 36. Spring 54 always tends to push mower unit 11 away from pulley 46 and, thus, maintains the proper belt tension.

The pulley sections 55 of double pulley 45 is coupled to pulleys 23 and 26 of mower unit 12 by the belt 56. As previously explained in connection with mower unit 11, the pulley alignments are such as to maintain driving engagement of belt 56 with pulleys 23 and 26.

As will be evident from the drawings, mower units 11 and 12 are spaced apart which would, of course, leave a strip of grass which would not have been cut. In order to cut this strip of grass, tractor unit 10 may be provided with an additional conventional mower unit 60 attached to and driven by the tractor engine in the conventional manner.

From the foregoing description it will be readily apparent that this invention provides a simple and inexpensive means for connecting multiple mower units to a tractor in such a manner that each mower unit is free to follow the contour of the ground. Furthermore, a drive linkage is provided which remains operative regardless of the movements of the mower units relative to the tractor.

The invention claimed is:

Lawn mowing apparatus for attachment to a tractor comprising a bracket attachable to the front end of a tractor, a bearing member mounted transversely of said bracket, a pair of mower connectors each comprising a cylindrical tube mounted for rotation on said bearing member and a forwardly projecting coupler tube, said connectors being mounted on said housing with said coupler tubes in laterally spaced relation, a pair of mowers disposed in side-by-side relation and each including a rearwardly projecting coupler telescoped with one of said forwardly projecting tubes in rotational relation thereto to permit tilting motion of said mowers about the longitudinal axes of said forwardly projecting tubes, and drive means for said mowers comprising drive pulleys mounted coaxially of said bearing member, drive pulleys mounted on said mowers for radial movement about the axis of said bearing member, and drive belts associated with the bearing mounted pulleys and the mower mounted pulleys, said forwardly projecting coupler tube having a spring compressed therein by said rearwardly projecting coupler and exerting a force tending to separate said couplers and tension said drive belts.

References Cited by the Examiner

UNITED STATES PATENTS

| 2,618,919 | 11/1952 | Hutchens | 56—25.4 |
| 2,688,833 | 9/1954 | Weiss et al. | 56—25.4 |
| 2,732,675 | 1/1956 | Smith et al. | 56—6 |
| 3,118,266 | 1/1964 | Colburn | 56—6 X |
| 3,135,079 | 6/1964 | Dunn | 56—6 |
| 3,136,106 | 6/1964 | Joslin | 56—25.4 |
| 3,166,880 | 1/1965 | Robinson | 56—6 |

FOREIGN PATENTS 228,943  6/1960  Australia.

ABRAHAM G. STONE, *Primary Examiner.*
RUSSELL R. KINSEY, T. GRAHAM CRAVER,
*Examiners.*